(12) United States Patent
Chou

(10) Patent No.: US 11,919,979 B2
(45) Date of Patent: *Mar. 5, 2024

(54) IONOMERS OF ETHYLENE ACID COPOLYMERS WITH ENHANCED CREEP RESISTANCE

(71) Applicant: Dow Global Technologies LLC, Midland, MI (US)

(72) Inventor: Richard Tien Hua Chou, Wilmington, DE (US)

(73) Assignee: Dow Global Technologies, LLC, Midland, MI (US)

(*) Notice: Subject to any disclaimer, the term of this patent is extended or adjusted under 35 U.S.C. 154(b) by 456 days.

This patent is subject to a terminal disclaimer.

(21) Appl. No.: 17/260,904

(22) PCT Filed: Jul. 26, 2019

(86) PCT No.: PCT/US2019/043586
§ 371 (c)(1),
(2) Date: Jan. 15, 2021

(87) PCT Pub. No.: WO2020/028159
PCT Pub. Date: Feb. 6, 2020

(65) Prior Publication Data
US 2021/0269566 A1    Sep. 2, 2021

Related U.S. Application Data

(60) Provisional application No. 62/712,596, filed on Jul. 31, 2018.

(51) Int. Cl.
C08F 210/02    (2006.01)
C08K 3/08    (2006.01)
C08L 23/08    (2006.01)

(52) U.S. Cl.
CPC ............ C08F 210/02 (2013.01); C08L 23/08 (2013.01); C08K 3/08 (2013.01)

(58) Field of Classification Search
USPC .......................................... 525/919; 526/271
See application file for complete search history.

(56) References Cited

U.S. PATENT DOCUMENTS

| | | |
|---|---|---|
| 3,264,272 A | 8/1966 | Rees |
| 4,766,174 A | 8/1988 | Statz |
| 5,580,927 A | 12/1996 | Chou et al. |
| 5,700,890 A | 12/1997 | Chou |
| 5,859,137 A | 1/1999 | Chou |
| 5,866,658 A | 2/1999 | Talkowski |
| 8,420,176 B2 | 4/2013 | Chen et al. |
| 9,415,274 B2 | 8/2016 | Sullivan et al. |
| 2003/0050373 A1 | 3/2003 | Chen |
| 2011/0020573 A1 | 1/2011 | Chou et al. |
| 2014/0364253 A1 | 12/2014 | Sullivan et al. |
| 2021/0261762 A1* | 8/2021 | Chou ................ C08F 220/06 |

FOREIGN PATENT DOCUMENTS

| | | |
|---|---|---|
| GB | 1113409 A | 5/1968 |
| JP | 2013500356 A | 1/2013 |
| WO | 0153415 A1 | 7/2001 |
| WO | 03064520 A2 | 8/2003 |
| WO | 2004113445 A1 | 12/2004 |

OTHER PUBLICATIONS

International Search Report and Written Opinion pertaining to PCT/US2019/043586, dated Feb. 3, 2020.
International Search Report and Written Opinion pertaining to PCT/US2019/043906, dated Nov. 12, 2019.
Japanese Office Action dated Jun. 27, 2023, pertaining to JP Patent Application No. 2021-503563, 23 pgs.
Non-Final Office Action dated May 5, 2023, pertaining to U.S. Appl. No. 17/260,902.
Chinese Office Action, dated Aug. 1, 2023, pertaining to Chinese Patent Application No. 201980047169.3, 6 pgs.
U.S. Office Action, dated Sep. 13, 2023, pertaining to U.S. Appl. No. 17/260,904, 14 pgs.
Chinese Office Action dated Oct. 28, 2023, pertaining to CN Patent Application No. 201980046713.2, 6 pgs.

* cited by examiner

*Primary Examiner* — Fred M Teskin

(74) *Attorney, Agent, or Firm* — Dinsmore & Shohl LLP

(57) ABSTRACT

According to one embodiment, an ionomer includes a neutralized blend of an ethylene acid copolymer. The ethylene acid copolymer comprises the polymerized reaction product of ethylene; from 2 to 20 wt. % of monocarboxylic acid monomer based on the total wt. % of the monomers present in the ethylene acid copolymer; from 2 to 15 wt. % of unsaturated dicarboxylic acid monomer based on the total wt. % of the monomers present in the ethylene acid copolymer. In the ionomer 10 to 60% of total acid units of the ethylene acid copolymer are neutralized by a magnesium cation.

13 Claims, No Drawings

IONOMERS OF ETHYLENE ACID COPOLYMERS WITH ENHANCED CREEP RESISTANCE

CROSS-REFERENCE TO RELATED APPLICATIONS

This application is a National Stage Entry under 35 U.S.C. § 371 of International Patent Application No. PCT/US2019/043586, filed Jul. 26, 2019, which claims priority to U.S. Application Ser. No. 62/712,596, filed on Jul. 31, 2018, the entire disclosures of which are hereby incorporated by reference This application claims priority to U.S. Application Ser. No. 62/712,596 filed on Jul. 31, 2018, the entire disclosure of which is hereby incorporated by reference.

TECHNICAL FIELD

Embodiments of the present disclosure generally relate to ionomer resins, and are specifically related to ionomers including the polymerized reaction product of the ethylene, monocarboxylic acid monomers, unsaturated dicarboxylic acid monomers, alkyl acrylate monomers, and combinations thereof, which are at least partially neutralized with magnesium cations.

BACKGROUND

Ionomers are commonly used materials in various applications, because they have higher tensile strength, greater clarity, better abrasion resistance and higher stiffness than the precursor acid copolymers. For example, the ionomers of ethylene acid copolymers have found utility in many applications, such as food packaging, foamed parts, injection molded parts (e.g., cosmetic containers), and golf ball components.

Although ionomers may be utilized in many applications, ionomers have a limited usage temperature that restricts ionomers from being used in applications in which creep resistance is needed at temperatures above 60° C. For example, an ionomer may deform under stress at temperature above 60° C. The dynamic mechanical thermal analysis reveals a large drop in mechanical strength of an ionomer at about 60° C., which correlates to the onset of the dissociation of the ion aggregates.

SUMMARY

Accordingly, it may be beneficial to develop alternative ionomers having improved creep resistance, while maintaining the physical and chemical character of the ionomer, such as optical clarity and toughness.

In one or more embodiments, ionomers of this disclosure include an ethylene acid copolymer, wherein the ethylene acid copolymer comprises the polymerized reaction product of ethylene, from 2 to 20 wt. % of monocarboxylic acid monomer based on the total wt. % of the monomers present in the ethylene acid copolymer, and from 2 to 15 wt. % of unsaturated dicarboxylic acid monomer based on the total wt. % of the monomers present in the ethylene acid copolymer. The ionomer includes from 10 to 70 mole percent of total acid units of the ethylene acid copolymer are neutralized by a magnesium cation. The ionomer exhibits a dimensional change of less than 25% under a stress of 20 psi at a temperature of 100° C. over a period of 30 minutes.

In one or more embodiments, an ionomer comprising a first ethylene acid copolymer and a second ethylene acid copolymer. The first ethylene acid copolymer is the polymerized reaction product of ethylene; from 2 to 20 wt. % of monocarboxylic acid based on the total wt. % of monomer present in the first ethylene acid copolymer; and from 0 to 40 wt. % of alkyl acrylate, based on the total wt. % of monomer present in the first ethylene acid copolymer. The second ethylene acid copolymer of the ionomer is the polymerized reaction product of ethylene; from 0 to 20 wt. % of monocarboxylic acid based on the total wt. % of monomer present in the second ethylene-based polymer; from 0 to 40 wt. % of alkyl acrylate, based on the total wt. % of the monomers present in the second ethylene acid copolymer; and from 2 to 15 wt. % unsaturated dicarboxylic acid monomer, based on the total wt. % of the monomers present in the second ethylene acid copolymer. The ratio of the first ethylene acid copolymer to the second ethylene acid copolymer in the ionomer is from 90/10 wt. % to 10/90 wt. %. From 10 to 80 mole percent of total acid units in the ionomer are neutralized, and from 10 to 70 mole percent of the total acid units of the blend are neutralized by a magnesium cation.

DETAILED DESCRIPTION

Unless otherwise defined, all technical and scientific terms used herein have the same meaning as commonly understood by one of ordinary skill in the art to which this disclosure belongs. In case of conflict, the specification, including definitions, will control.

Although methods and materials similar or equivalent to those described herein can be used in the practice or testing of various embodiments, suitable methods and materials are described herein.

Unless stated otherwise, all percentages, parts, ratios, etc., are by weight. When an amount, concentration, or other value or parameter is given as either a range, preferred range, or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having," or any other variation thereof, are intended to cover a non-exclusive inclusion. For example, a process, method, article, or apparatus that comprises a list of elements is not necessarily limited to those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the disclosure. Where applicants have defined an embodiment or a portion thereof with an openended term such as "comprising," unless otherwise stated, the description should be interpreted to also describe such an embodiment using the term "consisting essentially of."

Use of "a" or "an" are employed to describe elements and components of various embodiments. This is merely for convenience and to give a general sense of the various embodiments. This description should be read to include one or at least one and the singular also includes the plural unless it is obvious that it is meant otherwise.

The term "polymer" refers to a polymeric compound prepared by polymerizing monomers, whether of the same or a different type. The generic term polymer thus embraces the terms "homopolymer" and "copolymer." The term "homopolymer" refers to polymers prepared from only one type of monomer; the term "copolymer" refers to polymers prepared from two or more different monomers, and for the purpose of this disclosure may include "terpolymers" and "interpolymer."

The term "monocarboxylic acid monomer" means a molecule having a reactive portion, such as a vinyl or vinylene, that may bond to other monomers to form a polymer and a carboxylic acid (—C(O)OH) moiety that is not included in the reactive portion. For example, (meth)acrylic acid is a monocarboxylic acid monomer, in which the vinylene is the reactive portion and there is a carboxylic acid. The term "(meth)acrylic acid" includes methacrylic acid and/or acrylic acid and "(meth)acrylate" includes methacrylate, acrylate, or combinations of methacrylate and acrylate.

The term "unsaturated dicarboxylic acid monomer" as used in this disclosure means a molecule having a reactive portion, such as a vinyl or vinylene, that may bond to other monomers to form a polymer and two carboxylic acid (—C(O)OH) moieties that are not included in the reactive portion. Additionally, "unsaturated dicarboxylic acid monomer" includes dicarboxylic acid derivative monomers (half esters and anhydrides).

Various embodiments are directed to ionomers with improved creep resistance that include a neutralized blend of an ethylene acid copolymer. The ethylene acid copolymer includes the polymerized reaction product of ethylene, monocarboxylic acid monomer, and unsaturated dicarboxylic acid monomer. In the ionomer, 10% to 70% of total acid units of the ethylene acid copolymer are neutralized by a magnesium cation. The ionomer with improved creep resistance exhibits a dimensional change of less the 25% at 20 psi at a temperature 100° C. over a period of 30 minutes. In one or more embodiments, the ionomers exhibit a dimensional change of less than 25%, less than 20%, less than 15%, less than 10% under a stress of 20 psi at 100° C. for 30 minutes.

In one or more embodiments, the ethylene acid copolymer is a polymerization product of ethylene, monocarboxylic acid monomer, and unsaturated dicarboxylic acid monomer. The monocarboxylic acid monomer may include, for example, one or more of acrylic acid, methacrylic acid, or combinations thereof.

In one or more embodiments, the monocarboxylic acid monomer may be present in an amount of from 2 wt. % to 20 wt. % based on the total weight of the monomers present in the ethylene acid copolymer. All individual values and subranges encompassed by "from 2 wt. % to 20 wt. %" are disclosed as separate embodiments. For example, the monocarboxylic acid monomer may be present in an amount of from 5 wt. % to 15 wt. %, from 3 wt. % to 19 wt. %, or from 4 wt. % to 10 wt. % based on the total weight of the monomers present in the ethylene acid copolymer.

In one or more embodiments, the amount of unsaturated dicarboxylic acid monomer may be from 2 to 15 wt. % of unsaturated dicarboxylic acid monomer based on the total wt. % of the monomers present in the ethylene acid copolymer. All individual values and subranges encompassed by "from 2 wt. % to 15 wt. %" are disclosed as separate embodiments. For example, the unsaturated dicarboxylic acid monomer may be present in an amount of from 5 wt. % to 15 wt. %, from 3 wt. % to 10 wt. %, or from 4 wt. % to 10 wt. % based on the total weight of the monomers present in the ethylene acid copolymer. In embodiments, the dicarboxylic acid may include maleic anhydride, maleic anhydride mono-methyl ester, maleic anhydride mono-ethyl ester, maleic anhydride mono-propyl ester, maleic anhydride mono-butyl ester, or combinations thereof.

In embodiments of the ionomer of this disclosure, the ionomer may include a blend of two polymer resins, the first ethylene acid copolymer and a second ethylene acid copolymer. One of the first ethylene acid copolymer or the second ethylene acid copolymer contains unsaturated dicarboxylic acid monomer.

In one or more embodiments, an ionomer may include a neutralized blend of a first ethylene acid copolymer and a second ethylene acid copolymer. In one or more embodiments, the ratio of the first ethylene acid copolymer to the second ethylene acid copolymer is from 90/10 wt. % to 10/90 wt. %. In various embodiments, the neutralized blend includes from 60 to 90 wt. % of the first ethylene acid copolymer or from 60 to 80 wt. % first ethylene acid copolymer, based on a total weight of the blend. In some embodiments, the neutralized blend includes from 60 to 90 wt. % of the second ethylene acid copolymer or from 60 to 80 wt. % second ethylene acid copolymer, based on a total weight of the blend.

The ionomer of this disclosure may include 10 to 60% of total acid units of the blend are neutralized by a magnesium cation. In some embodiments of the ionomers, 20% to 50%, 20% to 60%, 25% to 60%, or 30% to 55% of total acid units of the blend are neutralized by a magnesium cation.

In various embodiments, the first ethylene acid copolymer is the polymerized reaction product of ethylene, from 2 to 20 wt. % of monocarboxylic acid based on the total wt. % of monomer present in the first ethylene acid copolymer, and from 0 to 40 wt. % of alkyl acrylate, based on the total wt. % of monomer present in the first ethylene acid copolymer.

In one or more embodiments, the second ethylene acid copolymer is the polymerized reaction product of ethylene, from 0 to 20 wt. % of monocarboxylic acid based on the total wt. % of the monomers present in the second ethylene acid copolymer, from 0 to 40 wt. % of alkyl acrylate, based on the total wt. % of the monomers present in the second ethylene acid copolymer, and from 2 to 15 wt. % unsaturated dicarboxylic acid monomer, based on the total wt. % of the monomers present in the ethylene acid copolymer.

In one or more embodiments, the monocarboxylic acid monomer may be present in the first ethylene acid copolymer or the second ethylene acid copolymer in an amount of from 0 wt. % to 20 wt. % based on the total weight of the monomers present in the ethylene acid copolymer. All individual values and subranges encompassed by "from 0 wt. % to 20 wt. %" are disclosed as separate embodiments. For example, the monocarboxylic acid monomer may be present in an amount of from 2 wt. % to 20 wt. %, from 5 wt. % to 30 wt. %, or from 4 wt. % to 10 wt. % based on the total weight of the monomers present in the ethylene acid copolymer.

In one or more embodiments, the amount of unsaturated dicarboxylic acid monomer in the second ethylene acid copolymers may be from 2 to 15 wt. % of unsaturated dicarboxylic acid monomer based on the total wt. % of the monomers present in the ethylene acid copolymer. All individual values and subranges encompassed by "from 2 wt. % to 15 wt. %" are disclosed as separate embodiments. For example, the unsaturated dicarboxylic acid monomer may be present in an amount of from 5 wt. % to 15 wt. %, from 3 wt. % to 10 wt. %, or from 4 wt. % to 10 wt. % based on the total weight of the monomers present in the second ethylene acid copolymer. In embodiments, the dicarboxylic acid may include maleic anhydride, maleic anhydride monomethyl ester, maleic anhydride mono-ethyl ester, maleic anhydride mono-propyl ester, maleic anhydride mono-butyl ester, or combinations thereof.

In various embodiments, the first ethylene acid copolymer or the second ethylene acid copolymer may include alkyl acrylate. In some embodiments, the first ethylene acid copolymer further includes from 0 wt. % to 40 wt. % alkyl acrylate based on the total weight of the monomers present in the ethylene acid copolymer. All individual values and subranges encompassed by "from 0 wt. % to 40 wt. %" are disclosed as separate embodiments. The first ethylene acid copolymer or second ethylene acid copolymer may include, for example, from 1 wt. % to 30 wt. % alkyl acrylate. The alkyl acrylate may be, by way of example and not limitation, ethyl acrylate, methyl acrylate, n-butyl acrylate, iso-butyl acrylate, or combinations thereof. In various embodiments, the alkyl acrylate has an alkyl group with from 1 to 8 carbons. This is designated a C2-C8-alkyl acrylate. In particular embodiments, the alkyl acrylate is n-butyl acrylate.

In one or more embodiments of the ethylene acid copolymer, the first ethylene acid copolymer, or the second ethylene acid copolymer, the unsaturated dicarboxylic acid monomer includes the reaction product of the precursor acid copolymers of dicarboxylic acids or a derivatives of a dicarboxylic acids. Unsaturated dicarboxylic acid monomer s may include maleic acid, itaconic acid, fumaric acid, maleic acid monoethyl ester (MAME), maleic anhydride mono-propyl ester, maleic anhydride mono-ethyl ester, maleic anhydride mono-butyl ester, or combinations thereof; and $C_1$-$C_4$-alkyl half esters of these acids, as well as anhydrides of these acids including maleic anhydride, maleic anhydride mono-methyl ester, maleic anhydride mono-ethyl ester, and itaconic anhydride. In some embodiments, the unsaturated dicarboxylic acid monomer may include, but are not limited to, maleic anhydride, ethyl hydrogen maleate, and methyl hydrogen maleate. The carboxylic acid or anhydride units of these monomers are capable of being neutralized with metal ions, just as the monocarboxylic acid carboxylic acid units are, though, as indicated, neutralization of the unsaturated dicarboxylic acid monomers may be different in its nature and effect on polymer properties, including melt behavior. Dicarboxylic acids can dehydrate to form intrachain anhydride units within the polymer (i.e., within a chain, rather than cross-linking interchain anhydride units).

In various embodiments of the ethylene acid copolymer, the first ethylene acid copolymer and the second ethylene acid copolymer may comprise at least 60 percent by weight of monomers derived from ethylene. All individual values and subranges encompassed by "60 weight percent" are disclosed herein as separate embodiments; for example, ethylene acid copolymer, the first ethylene acid copolymer, and the second ethylene acid copolymer of this disclosure may comprise at least 60 percent by weight of units derived from ethylene; at least 70 percent by weight of units derived from ethylene; at least 80 percent by weight of units derived from ethylene; or from 60 to 95 percent by weight of units derived from ethylene; or from 80 to 98 percent by weight of units derived from ethylene.

The ionomers of this disclosure include a neutralized blend of an ethylene acid copolymer or a neutralized blend of first ethylene acid copolymer and a second ethylene acid copolymer. The term "neutralized blend" include fully or partially neutralized ethylene acid copolymers. The ethylene acid copolymer may contain neutralized and un-neutralized monocarboxylic acid units, neutralized, mono-neutralized and un-neutralized dicarboxylic acid units, and intrachain anhydride units.

In referring to the total acid units neutralized, a monocarboxylic acid provides one acid unit, a dicarboxylic acid provides two acid units, an anhydride such as maleic anhydride is considered to provide two acid units, and half esters are considered to provide one acid unit. The calculation of percent neutralization is based on the number of acid units considered to be present as per above, and the number of metal equivalents added. In fact, anhydride units may remain as anhydride units rather than be changed to acid units. When subject to neutralization, an anhydride monomer unit may form a di-metal salt, a mono-metal salt, form an un-neutralized unsaturated dicarboxylic acid monomer, or leave the anhydride unit unaltered as an anhydride unit, acting as if it had no acid functionality. The half esters of unsaturated dicarboxylic acid monomer, while counted as having only one acid, may actually be converted to unsaturated dicarboxylic acid monomer or anhydrides, with the various possibilities related to neutralization noted above. As stated however, whatever the number of acid groups (free or neutralized) actually present, the calculated percent neutralization is based on the number of acid units based on the known amount of moles of the monocarboxylic acid and the dicarboxylic acid comonomer. In view of the various mutations of the unsaturated dicarboxylic acid monomer and salts possible, the actual percent of neutralized acid groups as a percent of actual total neutralized and non-neutralized free acid groups may therefore differ from the calculated percent neutralization, which is based the amount of monocarboxylic acid monomer or unsaturated dicarboxylic acid monomer in the ionomer. The difference is due to anhydride units, which are not acid units, but are counted as two acid units.

In some embodiments, the ionomer may include cations other than Mg cations and in addition to the Mg cation in the blend. The blend may be neutralized by at least one additional cation of a neutralizing salt. The neutralizing salt of the at least one additional metal cation may be selected from the group of zinc salt, lithium salt, and sodium salt. In some embodiments, the ionomers may include from 0% to 10%, from 1% to 10%, from 5% to 20%, from 5% to 30%, or from 10% to 50% of the total acid units of the blend are neutralized with sodium cation of the neutralizing salt, lithium cation of the neutralizing salt, zinc cation of the neutralizing salt, or combinations thereof.

In various embodiments, the ionomer exhibits improved creep resistance at elevated temperatures while maintaining their resiliency and foamability.

The ethylene acid copolymer can be prepared by standard free-radical copolymerization methods, using high pressure, operating in a continuous manner. Monomers are fed into the reaction mixture in a proportion, which relates to the monomer's activity, and the amount desired to be incorporated. In this way, uniform, near-random distribution of monomer units along the chain is achieved. Unreacted monomers may be recycled. Additional information on the preparation of ethylene acid copolymers including the alkyl acrylates monomer can be found in U.S. Pat. Nos. 3,264,272 and 4,766,174, each of which is hereby incorporated by reference in its entirety.

The blend can be produced by any means known to one skilled in the art. It is substantially melt-processable and can be produced by combining one or more ethylene acid copolymers or ionomers of the ethylene acid copolymers, one or more fatty acids or salts thereof, a basic metal compound, and a neutralizing composition including a trivalent metal cation to produce a mixture and heating the mixture under a condition sufficient to produce the composition. Heating can be carried out under a temperature in the range of from 80° C. to 350° C., from 120° C. to 300° C., or from 160° C. to 260° C. under a pressure that accommodates the temperature for a period from 30 seconds to 2 or 3 hours. The blend can be produced by melt-blending an ethylene acid copolymer and/or ionomer thereof with one or more fatty acids or salts thereof and concurrently or subsequently combining a sufficient amount of a basic metal compound and a trivalent metal cation. A salt blend of components can be made or the components can be melt-blended in an extruder. For example, a Werner & Pfleiderer twin-screw extruder can be used to mix and treat the ethylene acid copolymer and the organic acid (or salt) with the metal compound at the same time.

The blend can additionally include small amounts of additives including plasticizers, stabilizers including viscosity stabilizers, hydrolytic stabilizers, primary and secondary antioxidants, ultraviolet light absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. Inorganic fillers, such as calcium carbonate, and the like can also be incorporated into the blend.

These additives may be present in the blends in quantities ranging from 0.01 wt. % to 40 wt. %, 0.01 wt. % to 25 wt. %, 0.01 wt. % to 15 wt. %, 0.01 wt. % to 10 wt. %, or 0.01 wt. % to 5 wt. %. The incorporation of the additives can be carried out by any known process such as, for example, by dry blending, by extruding a mixture of the various constituents, by the conventional masterbatch technique, or the like.

In some embodiments, the ionomers according to this disclosure exhibit a load bearing capability at temperatures above the melting temperatures of the ionomers as measured by Differential Scanning calorimetry (DSC).

According to various embodiments, the ionomer may be used to form a foam or molded article. For example, in embodiments, the ionomer can be combined with additives used to control foam properties to form foams of various shapes. In some embodiments, the foam may be extruded, such as from a twin screw extruder, as is known to those of ordinary skill in the art.

Foaming agents (also referred to as blowing agents) used in the manufacture of foams can be physical foaming agents or chemical foaming agents. As used herein, "physical foaming agents" are low-boiling liquids, which volatilize under the curing conditions to form the blowing gas. Exemplary physical foaming agents include hydrocarbons, fluorocarbons, hydrofluorocarbons, hydrofluoroolefins, hydrochlorofluoroolefins, and other halogenated compounds. Other suitable chemical foaming agents can include, for example, sodium bicarbonate, ammonium bicarbonate, azodicarbonamide, dinitrosopentamethylenediamine, and sulfonyl hydrazides. Foaming agents such as water or carbon dioxide added as a gas or liquid, or generated in-situ by the reaction of water with polyisocyanate, may also be used. The foaming agents can be used in mixtures of two or more, and chemical and physical foaming agents can be used together to tailor expansion-decomposition temperature and foaming processes.

The foam composition can further include a free radical initiator or crosslinking agents, co-curing agents, an activator, and any other type of additive typically used in similar compositions, including but not limited to pigments, adhesion promoters, fillers, nucleating agents, rubbers, stabilizers, and processing aids.

Free radical initiators or crosslinking agents can include, by way of example and not limitation, organic peroxides such as dialkyl organic peroxides. Example organic peroxides suitable for use include 1,1-di-t-butyl peroxy-3,3,5-trimethylcyclohexane, t-butyl-cumyl peroxide, dicumyl-peroxide, 2,5-dimethyl-2,5-di(tertiary-butyl-peroxyl)hexane, 1,3-bis(tertiary-butyl-peroxyl-isopropyl)benzene, or combinations of two or more thereof.

Co-curing agents include trimethyl propane triacrylate (and similar compounds), N,N-m-phenylenedimaleimide, triallyl cyanurate, or combinations of two or more thereof.

Activators can include activators for the blowing agent, and can include one or more metal oxides, metal salts, or organometallic complexes. Examples include ZnO, Zn stearate, MgO, or combinations of two or more thereof.

The foam may be produced by a number of methods, such as compression molding, injection molding, and hybrids of extrusion and molding. The process can include mixing the components of the foam composition under heat to form a melt. The components may be mixed and blended using any technique known and used in the art, including Banbury, intensive mixers, two-roll mills, and extruders. Time, temperature, and shear rate can be regulated to ensure dispersion without premature crosslinking or foaming.

After mixing, shaping can be carried out. Sheeting rolls or calendar rolls can be used to make appropriately dimensioned sheets for foaming. An extruder may be used to shape the composition into pellets.

Foaming can be carried out in a compression mold at a temperature and time to complete the decomposition of peroxides and blowing agents. Pressures, molding temperature, and heating time can be controlled. Foaming can be carried out using injection molding equipment by using pellets made from the foam composition. The resulting foam can be further shaped to the dimension of finished products by any means known and used in the art, including thermoforming and compression molding.

In various embodiments, the resulting polymer foam composition can be substantially closed cell and useful for a variety of articles, e.g., footwear applications including midsoles or insoles.

In one or more embodiments, the molded article exhibits a dimensional change of less than 25%, less than 20%, less than 15%, less than 10% under a stress of 20 psi at 100° C. for 30 minutes.

The ionomers of the invention may be prepared by standard neutralization techniques, as disclosed in U.S. Pat. No. 3,264,272 (Rees), which is hereby incorporated by reference. The resulting ionomers, the compositions of this disclosure may have an MI of from 0.01 to 100 grams/10 minutes, preferably 0.1 to 30 grams/10 minutes according to ASTM D-1238 measured at using a 2160 gram weight, 210° C. In one or more embodiments, the ionomer has a density of from 0.920 to 0.980 g/cc.

The ethylene acid copolymer, the first ethylene acid copolymer, and the second ethylene acid copolymer this disclosure may be prepared by standard free-radical copolymerization methods, using high pressure, operating in a continuous manner. Monomers are fed into the reaction mixture in a proportion which relates to the monomer's reactivity, and the amount desired to be incorporated. In this way, uniform, near-random distribution of monomer units along the chain is achieved. Polymerization in this manner is well known, and is described in U.S. Pat. No. 4,351,931 (Armitage), which is hereby incorporated by reference. Other polymerization techniques are described in U.S. Pat. No. 5,028,674 (Hatch et al.) and U.S. Pat. No. 5,057,593 (Statz), both of which are also hereby incorporated by reference.

Example

Test Procedure

Melt Index, (MI) is measured using ASTM D-1238 using a 2160 gram weight.

Melting Point (Tm) was measured using Differential Scanning calorimetry (DSC). Differential Scanning calorimetry (DSC) is measured on a TA Instruments Q1000 DSC equipped with an RCS cooling accessory and an auto sampler. The melting point (Tm) of the samples are measured according to ASTM D3418.

The compositions of the ionomers were determined using a Perkin Elmer Fourier Transform Infrared Spectroscopy (FTIR). Compression molded films of 5 mil thickness were used for the FTIR analysis.

The following examples are provided to illustrate various embodiments, but are not intended to limit the scope of the claims. All parts and percentages are by weight unless otherwise indicated. Approximate properties, characters, parameters, etc., are provided below with respect to various working examples, comparative examples, and the materials used in the working and comparative examples. Further, a description of the raw materials used in the examples is as follows:

Example 1—Creep Resistance of Ethylene Acid Copolymers

Creep resistance is a function of time, temperature, and loading weight (stress). A simple testing was adopted to differentiate the creep resistance of ionomers with and without dicarboxylic acid co-monomer MAME neutralized with varied metal cations with and without MAME. The creep test was conducted by measuring the dimensional change (vertical) of film specimens attached to a dead load in a cross flow air oven with a shelf rack to hold specimen holders. Creep tests were performed on press molded film strips of 10 mils thick, one inch wide and 3 inches long cut out of compression molded film. The films were hung with a dead load of 100 grams with oven initially set at 100° C. The deformation of the film specimen was measured after 30 minutes in the oven. Then the oven temperature was increased to 120° C. for testing.

The results, as summarized in Table 1, include data derived from Inventive Examples 1.1-1.2, Comparative Terpolmer Examples CT 1.1-CT 1.4, and Comparative Copolymer Examples CC 1.1-CC 1.3. The polymer composition in Examples 1.1-1.2 are magnesium metal cation (Mg) neutralized samples of an ethylene/methyl acrylate acid/maleic acid monoethyl ester (E/MAA/MAME) terpolymer. Inventive Examples 1.1-1.2, Comparative Terpolmer Examples CT 1.1-CT 1.4, are all neutralized ionomers with varied metal cations to varied degree of neutralization based on a E/MAA/MAME (73/11/6 wt. %) terpolymer with a MI of about 100 g/10 minutes as measured according to ASTM D1238 using 2.16 kg at 190° C.

The polymer compositions of Comparative CC 1-CC 3 include E/MAA (85/15 wt. %) neutralized with Na, Zn, and Mg cations. The melting temperatures of the samples are reported. The creep resistance test was conducted in a cross-flow air oven with a shelf rack to hold the Specimen Holders. Each sample was in a form of film of 10 mil (one mil=1/1000 inch) thickness three inches long by one inch wide test specimens hung with a deadload of 100 grams. The film dropped to the bottom of the oven as it lost any load bearing capability.

TABLE 1

Creep Resistance of Ionomer Samples

| Sample | Ethylene Acid Copolymer | Metal Cation/ Neutralization (%) | Melting Point (° C.) | Creep Resistance Test at 100° C. | Creep Resistance Test at 120° C. |
| --- | --- | --- | --- | --- | --- |
| Example 1.1 | E/MAA/MAME (73/11/6 wt. %) | Mg, 18% | 86.6 | pass | failed |
| Example 1.2 | E/MAA/MAME (73/11/6 wt. %) | Mg, 37% | — | pass | pass |
| Comp. CT 1.1 | E/MAA/MAME (73/11/6 wt. %) | Zn, 50% | 89.2 | failed | — |
| Comp. CT 1.2 | E/MAA/MAME (73/11/6 wt. %) | Na, 18% | 93.6 | failed | — |
| Comp. CT 1.3 | E/MAA/MAME (73/11/6 wt. %) | Na/Zn, 40% | 87.9 | failed | — |
| Comp. CT 1.4 | E/MAA/MAME (73/11/6 wt. %) | Li, 40% | 90.3 | failed | — |
| Comp. CC 1.1 | E/MAA (85/15 wt. %) | Mg, 60% | — | failed | — |
| Comp. CC 1.2 | E/MAA (85/15 wt. %) | Na, 60% | 88.7 | failed | — |
| Comp. CC 1.3 | E/MAA (85/15 wt. %) | Zn, 60% | 86.8 | failed | — |

The results in Table 1 show that the Na, Zn and Mg neutralized samples of Comparison CC 1.1-CC 1.3 all failed at 100° C. For the film specimen that dropped to the bottom of the oven as it lost any load bearing capability was considered failed the creep test at 100 C., a temperature above the melting temperatures of the samples. It is expected that the ionomer samples lose the load bearing capability at temperatures above its melting temperatures. The Comparative CT 1.1-CT 1.4, which included Na, Li, Zn and Na/Zn cation to neutralize the acid E/MAA/MAME terpolymer, failed at 100° C. The results in Example 1.1 indicated that the Mg ionomer of E/MAA/MAME terpolymer passed the creep test at 100° C. The results in Example 1.2 indicated that the Mg (40% neutralized) passed the creep test at 100° C. and 120° C. Based on the results in Table 1, the Mg ionomers that includes the acid terpolymer of EE/MAA/MAME had better physical properties from those samples Na, Zn, Li, or Na/Zn ionomer. Mg ionomers, in Examples 1.1 and 1.2, were the only resins to have creep resistance above the melting points of the samples.

Example 2—Creep Resistance of Ionomer Blends

The results, as summarized in Table 2, are blends of varied ionomer samples of both E/MAA/MAME terpolymer and E/MAA copolymer. The blends were prepared in a 26 mm twin extruder with a mixing screw, using a melt temperature of between 220° C. to 250° C. The creep temperature is defined as the film reached a deformation of 25% strain under a load of 110 grams.

Examples 2.1. to 2.6 include polymer resin blends of Ethylene acid copolymer A, Ethylene acid copolymer B, and Ethylene acid copolymer C.

Ethylene acid copolymer A ("Polymer A") is a Mg ionomer of an ethylene acid copolymer comprising the polymerized reaction product of ethylene and 15 weight % of methacrylic acid wherein nominally 50 mole % of total acid units are neutralized with Mg cations. The ionomer has a melt index (MI) of 0.8 g/10 minutes as measured in accordance with ASTM D1238 at 190° C., 2.16 kg.

Ethylene acid copolymer B ("Polymer B") is a Zn ionomer of an ethylene acid copolymer comprising the polymerized reaction product of ethylene, 11 weight % of methacrylic acid, and 6 weight % of maleic anhydride monoethyl ester wherein nominally 50% of total acid units are neutralized with zinc cations. The ionomer has a MI of 1.0 g/10 minutes in accordance with ASTM D1238 at 210° C., 2.16 kg.

Ethylene acid copolymer C ("Polymer C") is a Mg ionomer of an ethylene acid copolymer comprising the polymerized reaction product of ethylene, 11 weight % of methacrylic acid and 6 weight % of maleic anhydride monoethyl ester wherein nominally 18% of total acid units are neutralized with zinc cations. The ionomer has a MI of 1.1 g/10 minutes in accordance with ASTM D1238 at 210° C., 2.16 kg.)

TABLE 2

Creep Resistance of Ionomer Blends

| Samples | Composition | Cation Type | Total Neu* Mol % | Mg Neu* Mol % | MAME (wt. %) | Creep Resistant Temp. ° C. | MI 210 ° C. |
|---|---|---|---|---|---|---|---|
| Example 2.1 | Polymer A/Polymer B (70/30 wt. %) | Mg/Zn | 50 | 35 | 1.8 | 100 | 0.74 |
| Example 2.2 | Polymer A/Polymer B (50/50 wt. %) | Mg/Zn | 50 | 25 | 3.0 | 120 | 0.52 |
| Example 2.3 | Polymer A/Polymer B (30/70 wt. %) | Mg/Zn | 50 | 15 | 4.2 | 100 | 0.45 |
| Example 2.4 | Polymer A/Polymer C (70/30 wt. %) | Mg | 40 | 40 | 1.8 | 100 | 1.09 |
| Example 2.5 | Polymer A/Polymer C (50/50 wt. %) | Mg | 34 | 34 | 3.0 | 130 | 0.34 |
| Example 2.6 | Polymer A/Polymer C (30/70 wt. %) | Mg | 29 | 29 | 4.2 | 130 | 0.33 |
| Comp. C2.1 | Polymer B (E/MAA/MAME (73/11/6 wt. %)) | Zn | 50 | 0 | 6.0 | 90 | — |
| Comp. C2.2 | Polymer A E/MAA (81/19 wt. %)) | Mg | 60 | 60 | 0 | 90 | — |

The results in Table 2 indicated that Examples of 2.2, 2.5 and 2.6, containing both MAME and Mg cation, attained a creep resistance above its melting temperatures. The ionomers in Examples 2.2, 2.5 and 2.6 contained MAME and Mg cation. Since the polymers in these Examples were the only polymers to achieve creep resistance at temperatures greater than the melting temperature, the MAME content and the Mg content are believed to work synergistically to increase the creep resistance. Accordingly, the data showed that Mg cation content and MAME content are two variables that lead to a higher creep resistance.

The creep test for Table 2 was conducted by measuring the dimensional change (vertical) of film specimens attached to a dead load in a cross flow air oven with a shelf rack to hold specimen holders. Creep tests were performed on press molded film strips of 10 mil thick, one inch wide and 3 inches long cut out of compression molded film of 10 mil thick. The films were hung with a dead load of 110 grams with oven initially set at 80° C. The deformation of the film specimen was measured after 30 minutes in the oven, and then the oven temperature was increased 10° C. The creep temperature was determined when the film specimen reached a deformation of 25% strain.

The invention claimed is:

1. A ionomer comprising an ethylene acid copolymer, wherein:
   the ethylene acid copolymer comprises the polymerized reaction product of:
      ethylene;
      from 2 to 20 wt. % of monocarboxylic acid monomer based on the total wt. % of the monomers present in the ethylene acid copolymer;
      from 2 to 15 wt. % of unsaturated dicarboxylic acid monomer based on the total wt. % of the monomers present in the ethylene acid copolymer; and
   wherein 10 to 70 mole percent of total acid units of the ethylene acid copolymer are neutralized by a magnesium cation;
   wherein the ionomer exhibits a dimensional change of less than 25% under a stress of 20 psi at a temperature of 100° C. over a period of 30 minutes.

2. An ionomer comprising a first ethylene acid copolymer and a second ethylene acid copolymer, wherein:
   the first ethylene acid copolymer is the polymerized reaction product of:
      ethylene;
      from 2 to 20 wt. % of monocarboxylic acid based on the total wt. % of monomer present in the first ethylene acid copolymer; and
      from 0 to 40 wt. % of alkyl acrylate, based on the total wt. % of monomer present in the first ethylene acid copolymer;
   the second ethylene acid copolymer is the polymerized reaction product of
      ethylene,
      from 0 to 20 wt. % of monocarboxylic acid based on the total wt. % of monomer present in the second ethylene-based polymer;
      from 0 to 40 wt. % of alkyl acrylate, based on the total wt. % of the monomers present in the second ethylene acid copolymer; and
      from 2 to 15 wt. % unsaturated dicarboxylic acid monomer, based on the total wt. % of the monomers present in the second ethylene acid copolymer; and
   wherein the ratio of the first ethylene acid copolymer to the second ethylene acid copolymer is from 90/10 wt. % to 10/90 wt. %;

wherein from 10 to 80 mole percent of total acid units are neutralized, and from 10 to 70 mole percent of the total acid units of the blend are neutralized by a magnesium cation.

3. The ionomer of claim 1, wherein the monocarboxylic acid monomer comprises one or more of acrylic acid, methacrylic acid, or combinations thereof.

4. The ionomer of claim 1, wherein the dicarboxylic acid comprises maleic anhydride, maleic anhydride mono-methyl ester, maleic anhydride mono-ethyl ester, maleic anhydride mono-propyl ester, maleic anhydride mono-butyl ester, or combinations thereof.

5. The ionomer of claim 2, wherein the blend is further neutralized with at least one additional metal cation selected from the group consisting of Zn, Li, and Na.

6. The ionomer of claim 2, wherein 20-60 mole percent of the total acid units of the blend are neutralized with the magnesium cation.

7. The ionomer of claim 2, wherein the alkyl acrylate of the first ethylene acid copolymer comprises methyl acrylate, ethyl acrylate, n-butyl acrylate or iso-butyl acrylate, or combinations thereof.

8. The ionomer of claim 2, wherein the monocarboxylic acid monomer of the second ethylene acid copolymer comprises one or more of acrylic acid, methacrylic acid, or combinations thereof.

9. The ionomer of claim 2, wherein the dicarboxylic acid comprises maleic anhydride, maleic anhydride mono-methyl ester, maleic anhydride mono-ethyl ester, maleic anhydride mono-propyl ester, maleic anhydride mono-butyl ester, or combinations thereof.

10. The ionomer of claim 2, wherein the alkyl acrylate of the second ethylene acid copolymer comprises methyl acrylate, ethyl acrylate, n-butyl acrylate or iso-butyl acrylate, or combinations thereof.

11. The ionomer of claim 2, wherein the monocarboxylic acid monomer of the first ethylene acid copolymer comprises one or more of acrylic acid, methacrylic acid, or combinations thereof.

12. The ionomer of claim 2, wherein the second ethylene acid copolymer comprises from 2 wt. % to 20 wt. % of the monocarboxylic acid based on the total wt. % of monomer present in the second ethylene-based polymer.

13. An ionomer comprising a first ethylene acid copolymer and a second ethylene acid copolymer, wherein:
the first ethylene acid copolymer is the polymerized reaction product of:
  ethylene;
  from 2 to 20 wt. % of monocarboxylic acid based on the total wt. % of monomer present in the first ethylene acid copolymer; and
  from 0 to 40 wt. % of alkyl acrylate, based on the total wt. % of monomer present in the first ethylene acid copolymer;
the second ethylene acid copolymer is the polymerized reaction product of ethylene,
  from 0 to 20 wt. % of monocarboxylic acid based on the total wt. % of monomer present in the second ethylene-based polymer;
  from 0 to 40 wt. % of alkyl acrylate, based on the total wt. % of the monomers present in the second ethylene acid copolymer; and
  from 2 to 15 wt. % unsaturated dicarboxylic acid monomer, based on the total wt. % of the monomers present in the second ethylene acid copolymer; and
wherein the ratio of the first ethylene acid copolymer to the second ethylene acid copolymer is from 90/10 wt. % to 10/90 wt. %;
wherein from 10 to 80 mole percent of total acid units are neutralized, and from 20 to 60 mole percent of the total acid units of the blend are neutralized by a magnesium cation.

* * * * *